(12) United States Patent
Akaba et al.

(10) Patent No.: US 12,034,343 B2
(45) Date of Patent: Jul. 9, 2024

(54) TEMPERATURE SENSOR AND ELECTRIC MOTOR

(71) Applicant: SHIBAURA ELECTRONICS CO. LTD., Saitama (JP)

(72) Inventors: Hiroaki Akaba, Saitama (JP); Takamasa Yoshihara, Saitama (JP)

(73) Assignee: SHIBAURA ELECTRONICS CO. LTD., Saitama (JP)

( * ) Notice: Subject to any disclaimer, the term of this patent is extended or adjusted under 35 U.S.C. 154(b) by 236 days.

(21) Appl. No.: 17/753,347

(22) PCT Filed: Oct. 8, 2020

(86) PCT No.: PCT/JP2020/038112
§ 371 (c)(1),
(2) Date: Feb. 28, 2022

(87) PCT Pub. No.: WO2021/070898
PCT Pub. Date: Apr. 15, 2021

(65) Prior Publication Data
US 2022/0320971 A1    Oct. 6, 2022

(30) Foreign Application Priority Data
Oct. 10, 2019 (JP) ................. 2019-186515

(51) Int. Cl.
*H02K 11/25* (2016.01)
*G01K 1/14* (2021.01)
*G01K 7/22* (2006.01)

(52) U.S. Cl.
CPC .............. *H02K 11/25* (2016.01); *G01K 1/14* (2013.01); *G01K 7/22* (2013.01)

(58) Field of Classification Search
CPC .. G01K 1/14; G01K 1/08; G01K 1/16; G01K 1/143; G01K 1/146; G01K 1/10;
(Continued)

(56) References Cited

U.S. PATENT DOCUMENTS

2017/0370781 A1* 12/2017 Yoshihara ................ G01K 7/22
2018/0156669 A1*  6/2018 Koyama ................. G01K 13/08

FOREIGN PATENT DOCUMENTS

JP     2003-092858 A     3/2003
JP     2005-326367 A    11/2005
(Continued)

OTHER PUBLICATIONS

International Search Report for PCT/JP2020/038112 dated Dec. 28, 2020 and translation thereof.
Written Opinion for PCT/JP2020/038112 dated Dec. 28, 2020.

*Primary Examiner* — Bryan R Perez
(74) *Attorney, Agent, or Firm* — Pearne & Gordon LLP

(57) ABSTRACT

An object is to more surely prevent a temperature sensor inserted into a gap between coils, from slipping out of the gap. A temperature sensor includes: a sensor element including a thermosensitive body, paired electric wires electrically connected to the thermosensitive body, and a covering body having elasticity and covering the thermosensitive body; and a housing including an abutting portion and a supporting portion extending in a direction intersecting with the abutting portion, and the housing holding the sensor element. The covering body protrudes from the abutting portion at a position separated by a predetermined distance from the supporting portion. The paired electric wires are drawn out from the housing in a direction intersecting with the covering body.

20 Claims, 11 Drawing Sheets

(58) Field of Classification Search
CPC .. G01K 1/12; G01K 7/22; G01K 7/16; G01K 7/18; G01K 7/223; G01K 7/02
See application file for complete search history.

(56) References Cited

FOREIGN PATENT DOCUMENTS

| | | |
|---|---|---|
| JP | 2008-178222 A | 7/2008 |
| JP | 2010-252508 A | 11/2010 |
| JP | 2013-51806 A | 3/2013 |

\* cited by examiner

FIG. 6
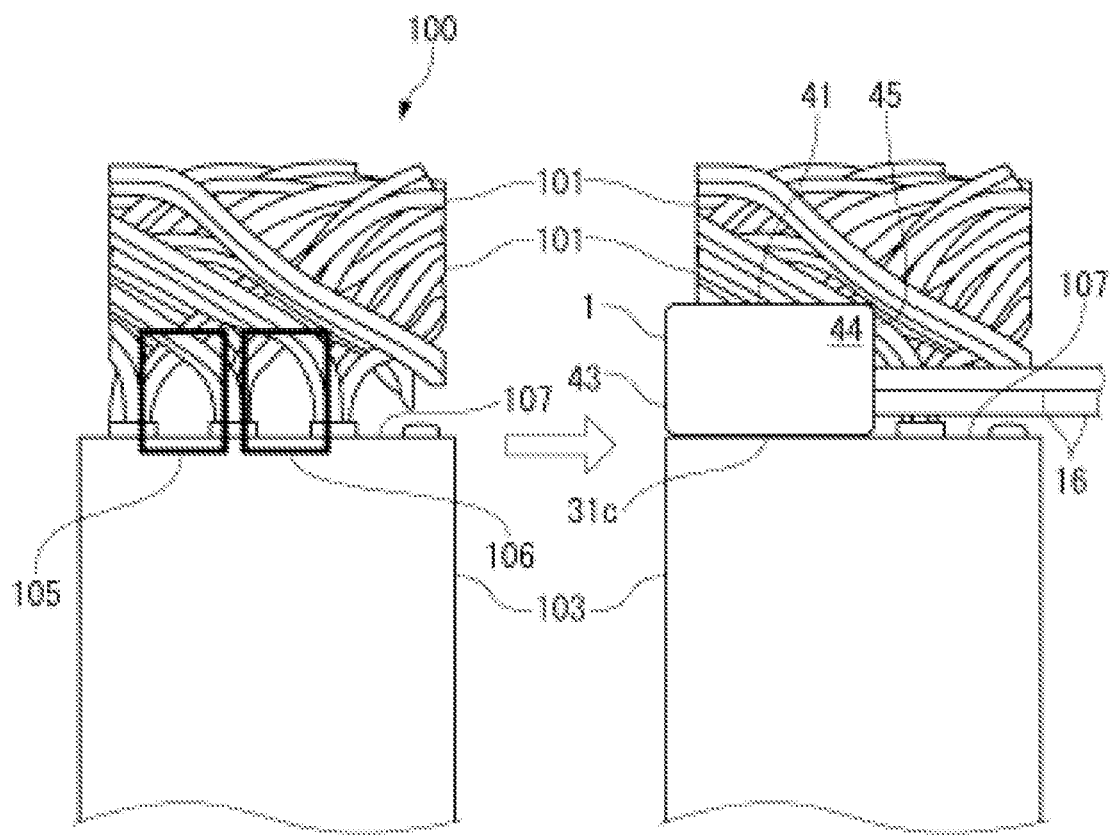
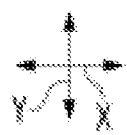

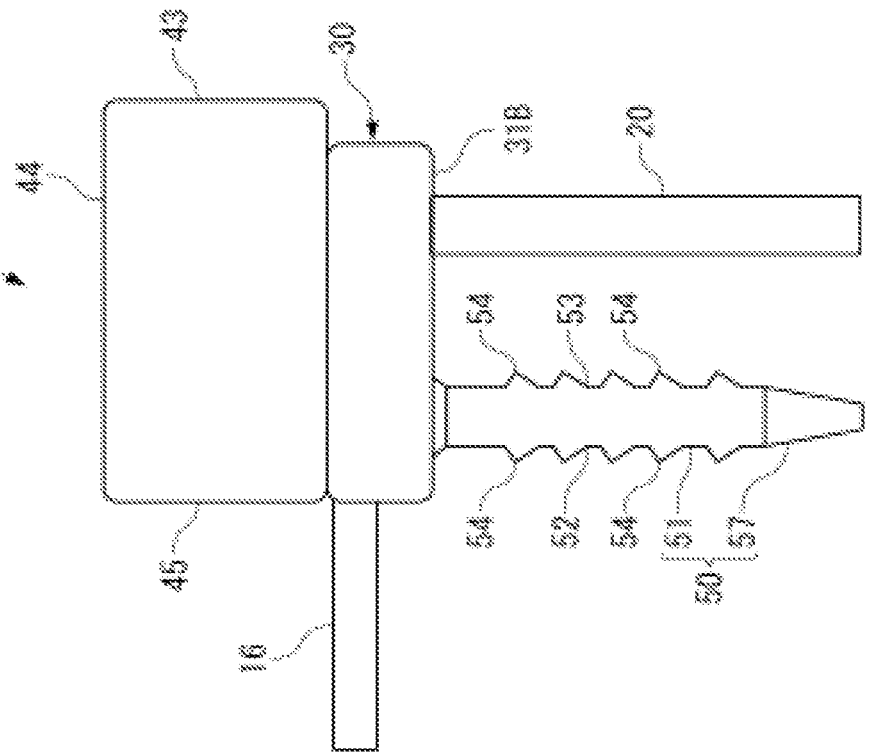
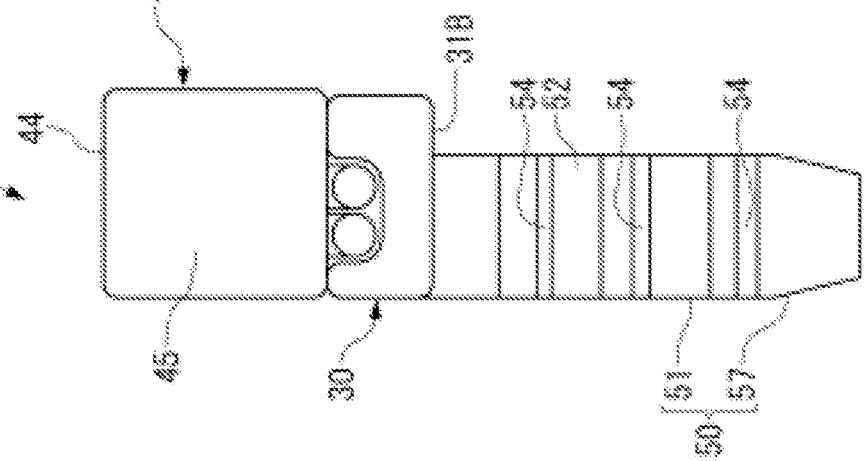

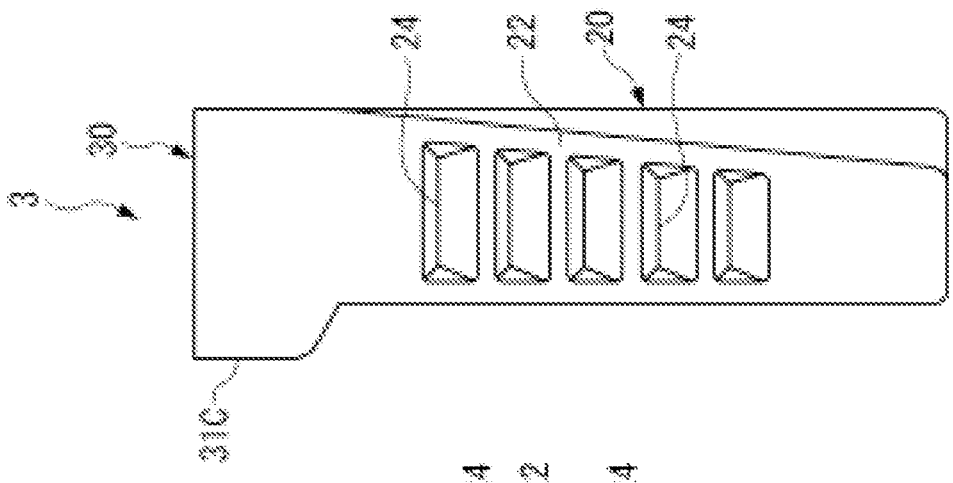
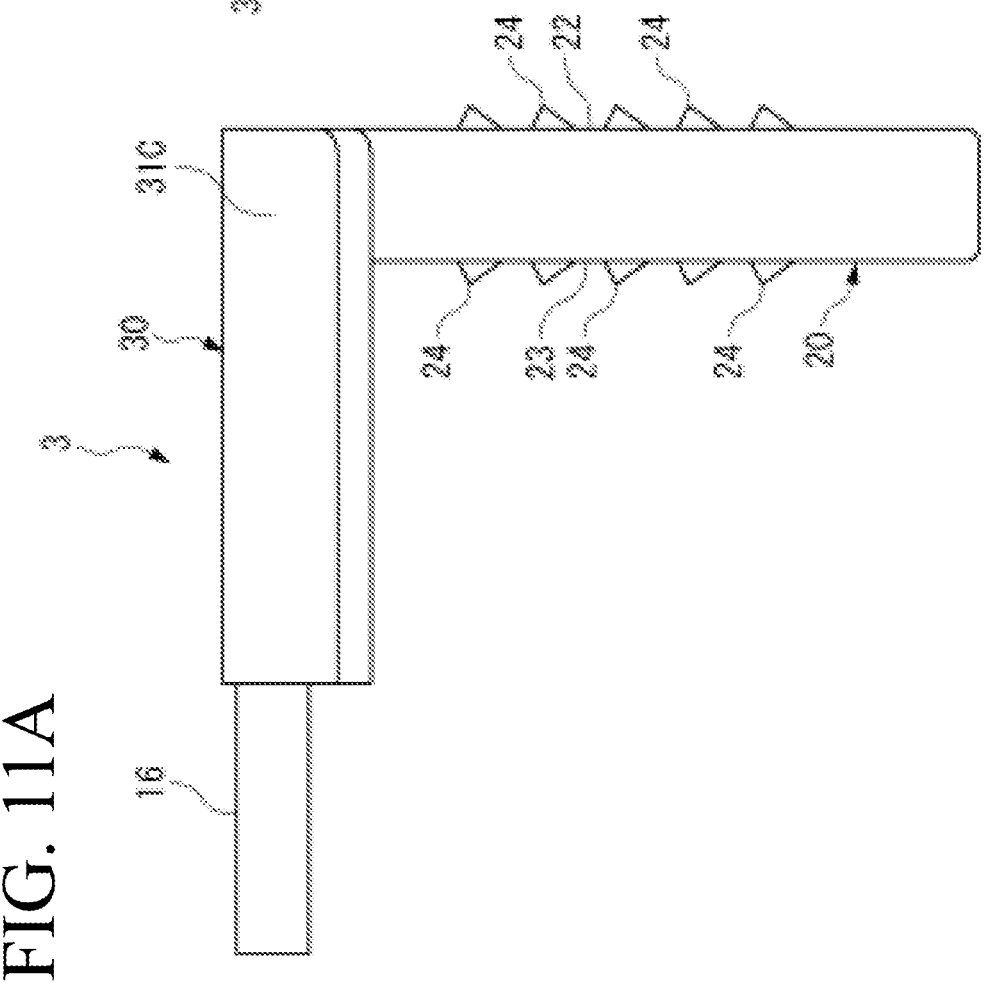

TEMPERATURE SENSOR AND ELECTRIC MOTOR

CROSS-REFERENCE TO RELATED APPLICATIONS

This is a National Stage application of PCT international application PCT/JP2020/038112, filed on Oct. 8, 2020 which claims priority from Japanese Patent Application No. 2019-186515, filed on Oct. 10, 2019, the contents of which are incorporated herein by reference in their entireties.

TECHNICAL FIELD

The present invention relates to a temperature sensor suitable for detecting a temperature of a coil of a stator in an electric motor.

BACKGROUND ART

In an electric motor, when a current flows through a coil provided in a stator, a temperature of the coil increases. To avoid excess temperature increase of the coil and to stably operate the electric motor, the temperature of the coil is detected by a temperature sensor, and operation of the electric motor is controlled based on the detected temperature.

Patent Literature 1 proposes that, in a stator including a plurality of teeth portions, a temperature detection element is inserted into a gap between coils wound around the adjacent teeth portions, to detect a temperature of each of the coils. In the proposition by Patent Literature 1, a temperature detection unit of the temperature detection element is brought into contact with at least one of the coils.

CITATION LIST

Patent Literature

Patent Literature 1: JP 2010-252508 A

SUMMARY OF INVENTION

Technical Problem

In a case of the temperature sensor inserted into the gap between the coils as disclosed in Patent Literature 1, it is necessary to prevent the temperature sensor from slipping out of the gap while the temperature sensor detects the temperature. In the proposition by Patent Literature 1, a holder holding the temperature sensor is made of an elastic material, and the holder is elastically deformed to cause the temperature sensor to be sandwiched between the coils.

An object of the present invention is to make it difficult for the temperature sensor inserted into the gap between the coils to slip out of the gap.

Solution to Problem

A temperature sensor according to the present invention is used with being attached to an electric motor, to detect a temperature of a coil wound around a core of the electric motor. The temperature sensor according to the present invention includes: a sensor element including a thermosensitive body, paired electric wires electrically connected to the thermosensitive body, and an electrically insulating covering body covering the thermosensitive body and the paired electric wires; and a housing including an abutting portion abutting on the coil, and a supporting portion extending in a direction intersecting with the abutting portion and supported by the core, the supporting portion holding the sensor element.

The covering body according to the present invention protrudes from the abutting portion at a position separated by a predetermined distance from the supporting portion.

In the temperature sensor according to the present invention, the housing is preferably the covering body is formed in a prism shape, and the paired electric wires are preferably drawn out from an end of the covering body in a longitudinal direction to outside the covering body and inside the housing.

In the temperature sensor according to the present invention, the paired electric wires are preferably changed in direction to a direction intersecting with the covering body inside the housing, and are preferably drawn out from the housing.

The paired electric wires according to the present invention preferably each include a folded part directed to the thermosensitive body and a bent part bent in a direction intersecting with the covering body, inside the housing. A portion ahead of the bent part is drawn out from the housing.

The housing according to the present invention preferably includes a housing chamber for the electric wires, formed along the folded parts and the bent parts.

The housing according to the present invention preferably includes a first housing and a second housing. The first housing includes the abutting portion and the supporting portion. The second housing covers an opening of the first housing. In the present invention, the first housing and the second housing are assembled to each other to form the housing chamber for the electric wires, along the folded parts and the bent parts.

The temperature sensor according to the present invention is preferably attached to a stator of the electric motor.

In the temperature sensor according to the present invention, serrations are preferably provided on a surface of the covering body or a surface of a fixing member provided along with the covering body.

The present invention provides an electric motor including the above-described temperature sensor. The temperature sensor measures a temperature of a coil.

The electric motor according to the present invention includes a stator and a rotor. The stator includes a core and a coil wound around the core. The rotor is provided to be rotatable to the stator. The covering body of the temperature sensor is inserted into a gap formed between the core and the coil, the abutting portion of the housing abuts on an end surface of the coil, and the supporting portion is supported by the core.

Advantageous Effects of Invention

According to the temperature sensor of the present invention, the covering body is inserted into the gap while the supporting portion of the housing is supported by the coil. Therefore, deflecting the covering body in the height direction makes it possible to bring the covering body into tight contact with the coil. Thus, according to the temperature sensor of the present invention, it is possible to make it difficult for the covering body to slip out of the gap, and to detect the temperature with high accuracy.

BRIEF DESCRIPTION OF DRAWINGS

FIG. 6 is a diagram illustrating a stator to which the temperature sensor temperature in FIG. 1 is assembled.

FIGS. 9A and 9B each illustrate the temperature sensor according to the first modification, FIG. 9A being a front view, and FIG. 9B being a side view.

FIGS. 11A and 11B each illustrate the temperature sensor according to the second modification, FIG. 11A being a side view, and FIG. 11B being a rear view.

DESCRIPTION OF EMBODIMENT

Figure 1:
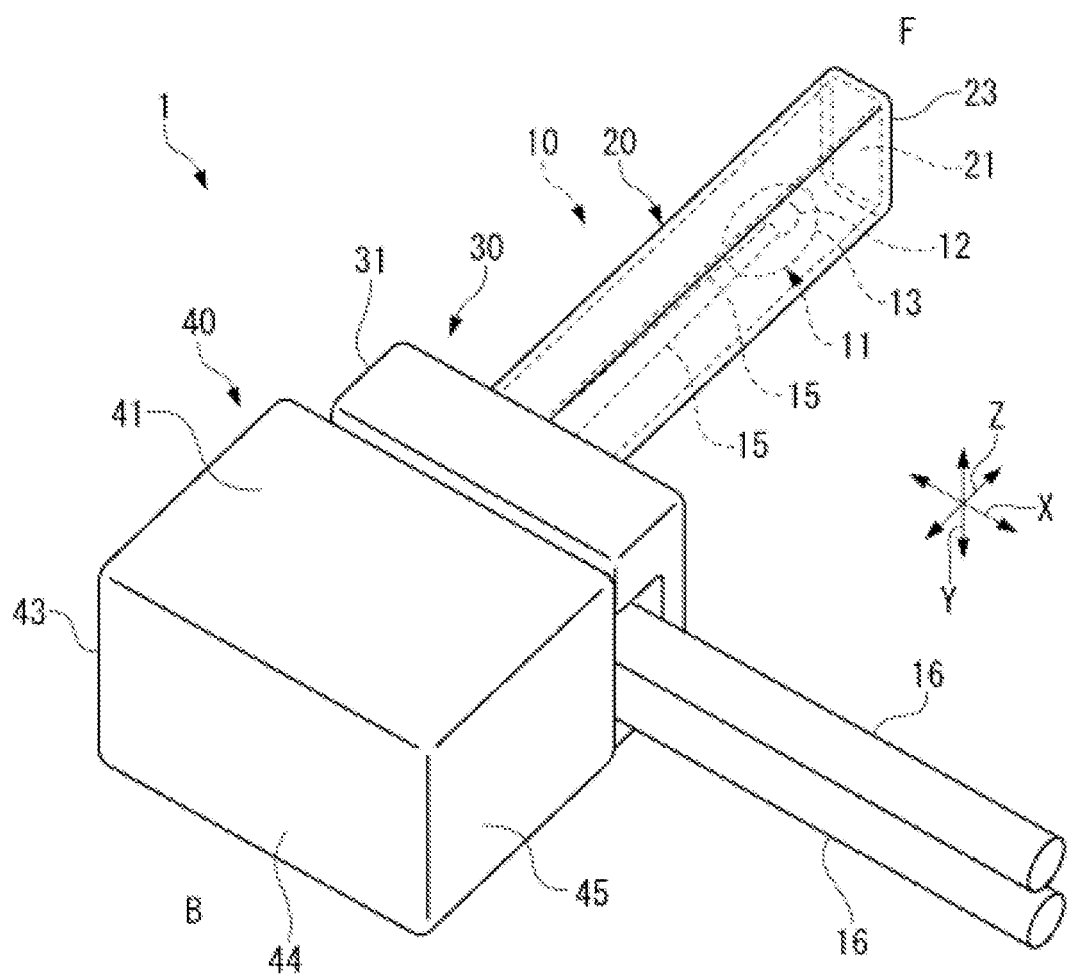
FIG. 1 is a perspective view illustrating a temperature sensor according to an embodiment of the present invention.

A preferred embodiment of the present invention is described below with reference to accompanying drawings.

A temperature sensor 1 according to the present embodiment is used to detect a temperature of a stator configuring an electric motor. The temperature sensor 1 illustrated in FIG. 1 detects a temperature of a coil 101 of a stator 100 by a sensor element 10 inserted into a gap (FIG. 6) of the coil 101. The temperature sensor 1 includes the sensor element 10, a first housing 30 that holds the sensor element 10 and houses a part of the sensor element 10, and a second housing 40 covering the first housing 30.

Figure 7:
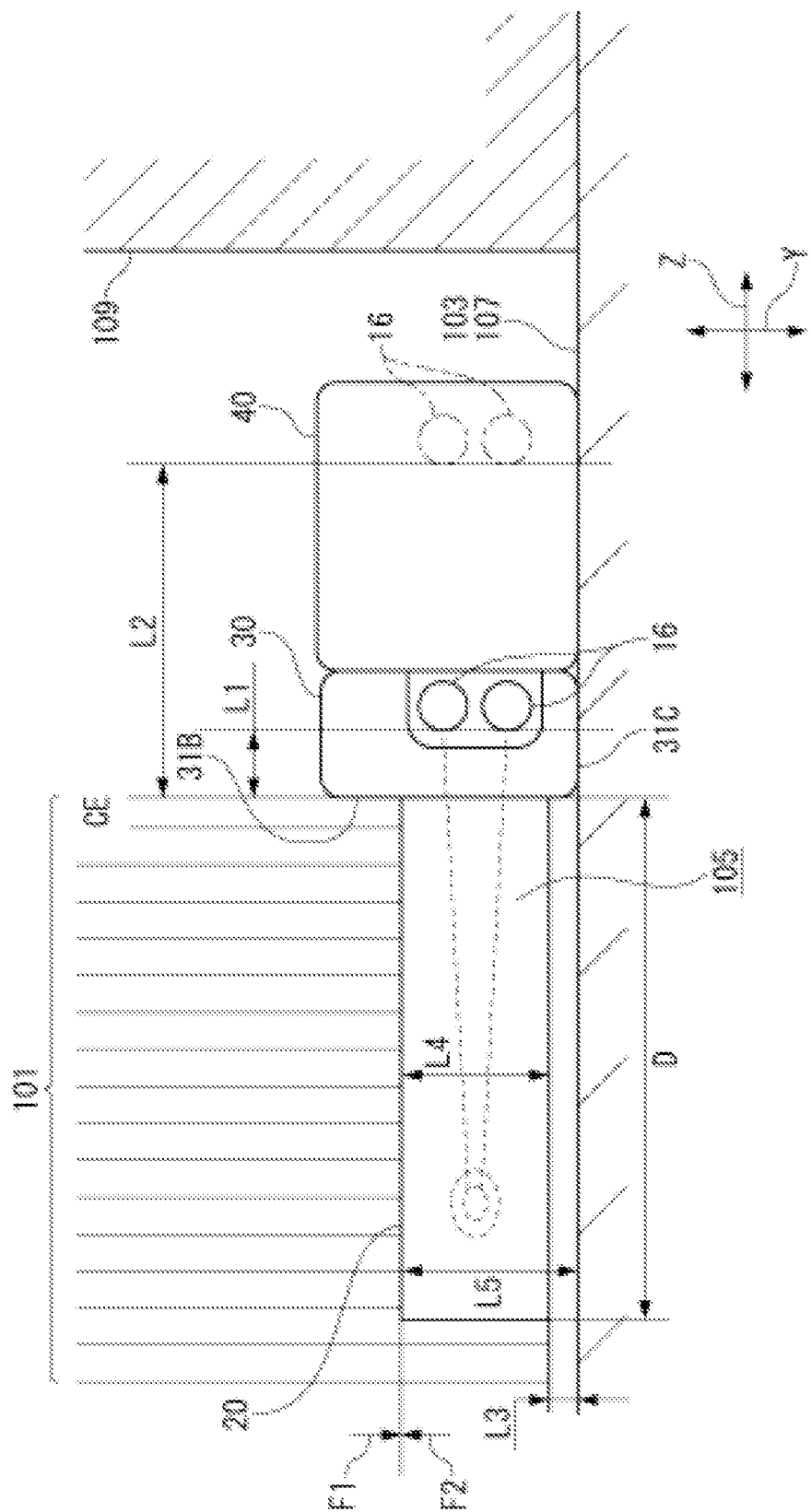
FIG. 7 is a diagram illustrating relationship between the assembled temperature sensor and the stator.

As illustrated in FIG. 6 and FIG. 7, in the temperature sensor 1, the first housing 30 is supported by a core 103 of the stator 100, which generates pressing force between the sensor element 10 and the coil 101. The temperature sensor 1 is made difficult to slip out of the gap of the coil 101 by the force.

[Sensor Element 10]

Figure 2A:
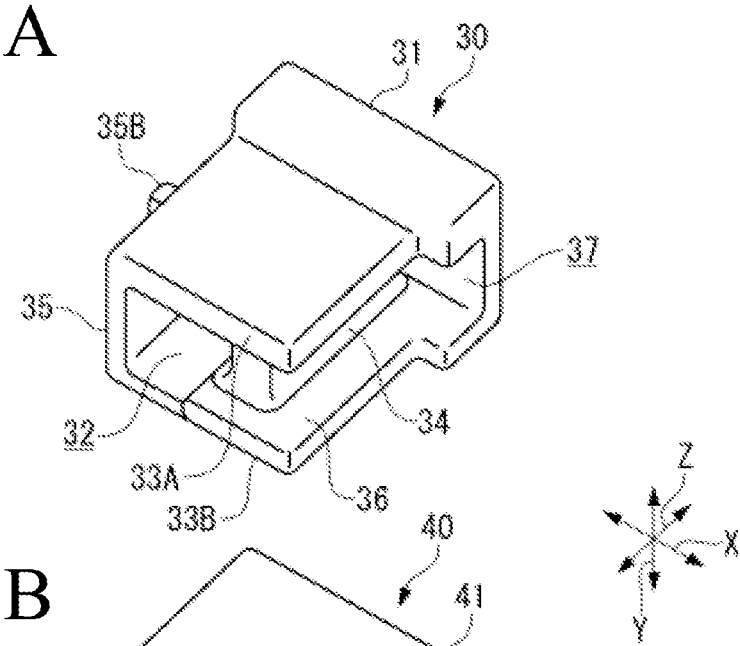
FIGS. 2A to 2C are exploded perspective views of the temperature sensor in FIG. 1.
Figure 2B:
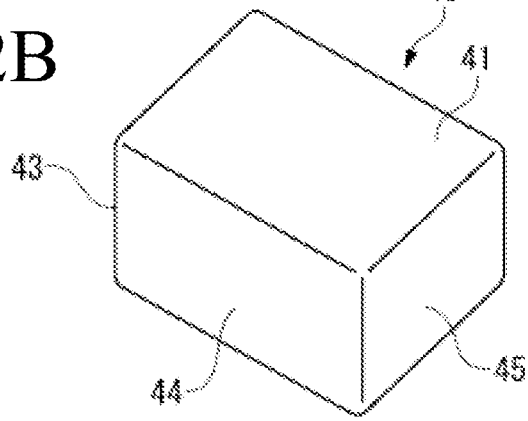
Figure 2C:
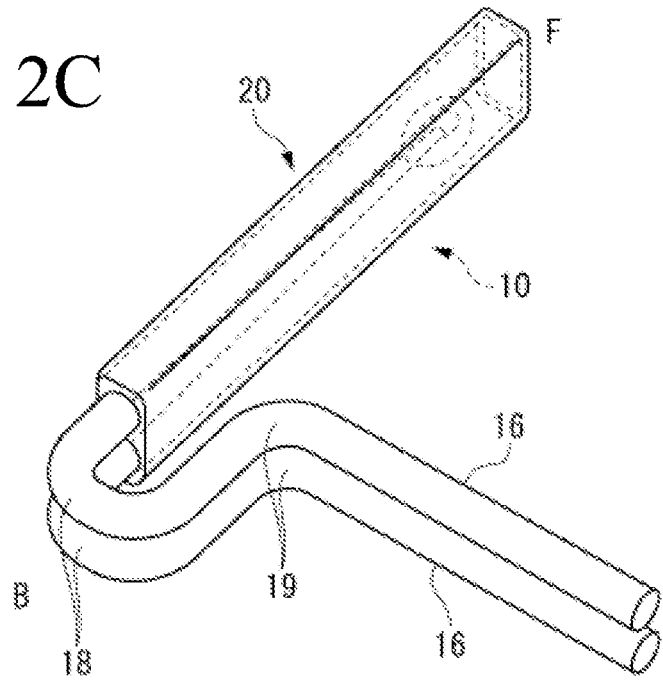

As illustrated in FIG. 1 and FIG. 2, the sensor element 10 includes a device 11, paired extension wires 15 and 15 electrically connected to the device 11, and paired lead wires 16 and 16 electrically connected to the respective extension wires 15 and 15.

Note that, in the temperature sensor 1, a width direction X, a height direction Y, and a front-rear direction Z are specified as illustrated by double-headed arrows in FIG. 1. In the front-rear direction Z, in a state where the sensor element 10 in FIG. 1 is held by the first housing 30, a side on which the device 11 is disposed is defined as a front side F of the temperature sensor 1, and a side opposite thereto is defined as a rear side B of the temperature sensor 1. This definition applies to the following description.

The device 11 is a member including a thermosensitive body 12 having temperature characteristics in electric resistance, and a sealing glass 13 covering surroundings of the thermosensitive body 12.

The thermosensitive body 12 includes, for example, a material having temperature characteristics in electric resistance, like a thermistor.

The sealing glass 13 is provided to seal and maintain the thermosensitive body 12 in an airtight state, thereby preventing chemical change and physical change due to an ambient environment from occurring on the thermosensitive body 12. Amorphous glass and crystalline glass are both usable for the sealing glass 13, and the amorphous glass and the crystalline glass may be mixed so as to have a desired linear expansion coefficient, and resultant glass may be used for the sealing glass 13.

The extension wires 15 and 15 each include, for example, a Dumet wire, and are electrically connected to the thermosensitive body 12 through unillustrated electrodes. The Dumet wire includes an inner layer and an outer layer provided around the inner layer. The inner layer is made of an iron-nickel alloy having a linear expansion coefficient close to the linear expansion coefficient of glass, and the outer layer is cladded with copper or a copper alloy having high electroconductivity.

The lead wires 16 and 16 each include, for example, a twisted wire obtained by twisting thin core wires, and an electrically insulating covering layer covering the twisted wire. The lead wires 16 and 16 are connected to an unillustrated temperature measurement circuit through other electric wires as necessary. Note that the covering layer is made of a fluorine resin such as PTFE (polytetrafluoroethylene) and PFA (tetrafluoroethylene-perfluoroalkyl vinyl ether copolymer).

One of the extension wires 15 and the corresponding lead wire 16 connected to each other configures an electric wire according to the present invention.

As illustrated in FIG. 1, in the sensor element 10, the device 11, the extension wires 15, and a part of the lead wires 16 are covered with an electrically insulating covering body 20, and the electrically insulating covering body 20 protects these members from an ambient environment.

The covering body 20 has a substantially rectangular parallelepiped appearance, in particular, has a prism-shaped appearance. As a preferable example, the covering body 20 has a two-layer structure including an inner layer 21 and an outer layer 23. However, the covering body according to the present invention may have a columnar shape, and a well-known resin material is widely usable as a material of the covering body as long as the material has heat resistance and durability.

The inner layer 21 is disposed inside the outer layer 23, and directly covers the device 11. The inner layer 21 airtightly seals a portion from a front end of the device 11 to a middle of the lead wires 16 and 16. The inner layer 21 is made of, for example, PFA (tetrafluoroethylene-perfluoroalkyl vinyl ether copolymer) that is a fluorine resin. The PTFE and the PFA are fluorine resins and are excellent in durability in common; however, the PTFE has a melting point higher than a melting point of the PFA. Further, the PTFE and the PFA both have transparency, and in particular, the PFA has high transparency.

The outer layer 23 is provided in close contact with outside of the inner layer 21.

The outer layer 23 imparts durability to the device 11 together with the inner layer 21, and holds the inner layer 21 melted during a manufacturing process. Therefore, the outer layer 23 is made of the PTFE having the melting point higher than the melting point of the PFA forming the inner layer 21.

For example, the covering body 20 is fabricated in such a manner that an inner layer tube corresponding to the inner layer 21 and an outer layer tube corresponding to the outer layer 23 are prepared, the device 11 is inserted into the inner layer tube and the outer layer tube is disposed outside the inner layer tube, and the tubes are heated and pressurized.

The melting point of the PFA configuring the inner layer tube is 302° C. to 310° C., whereas the melting point of the PTFE configuring the outer layer tube is 327° C. Therefore, when both tubes are heated to, for example, 315° C., the inner layer tube is melted but the outer layer tube is not melted and can keep its shape. The outer layer tube, however, contracts when heated to the temperature. The linear expansion coefficient of the PTFE is about $10 \times 10^{-5}$/° C., and strongly compresses the melted inner layer tube. This contributes to densification of the inner layer 21, and pressure generated between the inner layer 21 and the outer layer 23 secures airtightness therebetween.

Figure 3A:
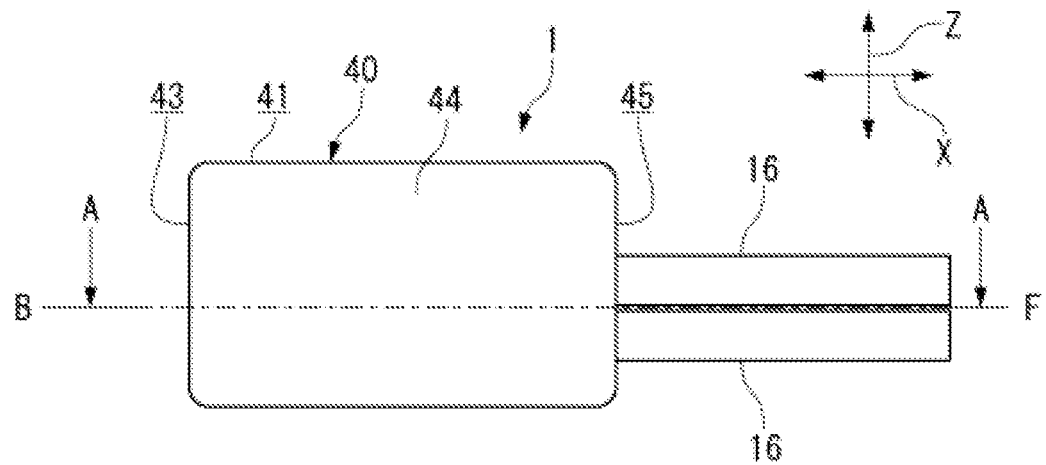
FIGS. 3A and 3B each illustrate the temperature sensor in FIG. 1, FIG. 3A being a back view, and FIG. 3B being a cross-sectional view taken along line A-A in FIG. 3A.

In the sensor element 10, as illustrated in FIG. 2 and FIG. 3, the lead wires 16 each include a folded part 18 and a bent part 19. In other words, portions of the lead wires 16 drawn out from an end of the covering body 20 in a longitudinal direction to outside the covering body 20 and inside the first housing 30 and the second housing 40, straightly extends toward the rear side B. The portions are folded at the folded parts 18 and extend toward the front side F, namely, toward the thermosensitive body 12. Further, the portions of the lead wires 16 are bent at the bent parts 19 and extend in a direction intersecting with the covering body 20, more specifically, in a direction orthogonal to the covering body 20, and are drawn out from the first housing 30 and the second housing 40. The folded parts 18 and the bent parts 19 are elements making it difficult for the sensor element 10 to slip out of the coil 101.

[First Housing 30]

Next, the first housing 30 is described.

The first housing 30 has a function to hold the sensor element 10. Further, the first housing 30 has a function to generate pressing force between the sensor element 10 and the coil 101 of the stator 100, thereby making it difficult for the sensor element 10 to slip out of the coil 101. In the following, this function is referred to as a first function in some cases. The first housing 30 further has a function to regulate an insertion depth of the sensor element 10 into the coil 101, thereby preventing the sensor element 10 from penetrating through the coil 101 and colliding with, for example, a rotor of the electric motor. In the following, this function is referred to as a second function in some cases. As described above, the first housing 30 has at least three functions.

As illustrated in FIG. 2A to FIG. 4, the first housing 30 includes a reference wall 31, paired side walls 33A and 33B extending from respective sides of the reference wall 31 in the height direction Y toward the rear side B, a connection wall 35 connecting one of edges in the width direction X of the side wall 33A and one of edges in the width direction X of the side wall 33B, an opening 36 provided on the other edge in the width direction X of the side wall 33A and the other edge in the width direction X of the side wall 33B, and a partition wall 34 that is provided between the connection wall 35 and the opening 36 and is parallel to the connection wall 35.

The first housing 30 is integrally formed by, for example, injection molding of a resin material.

Figure 3B:
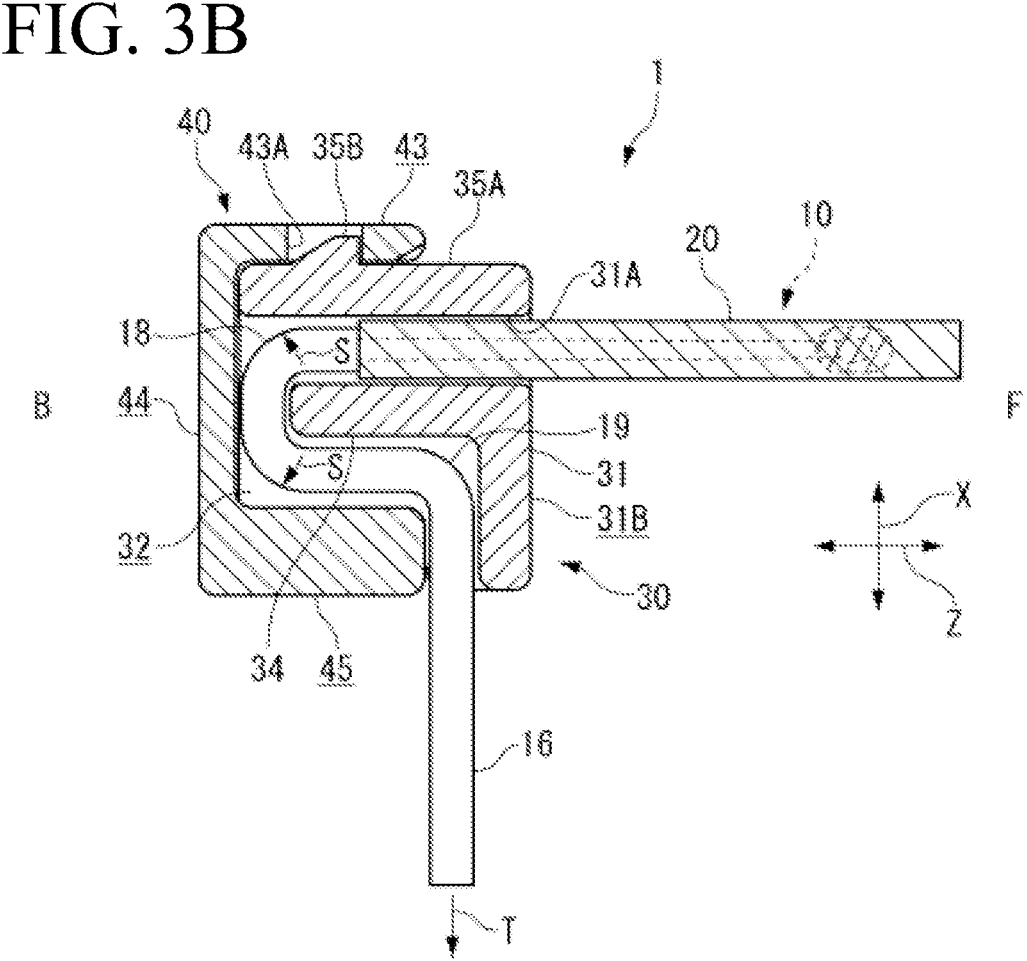
Figure 4:
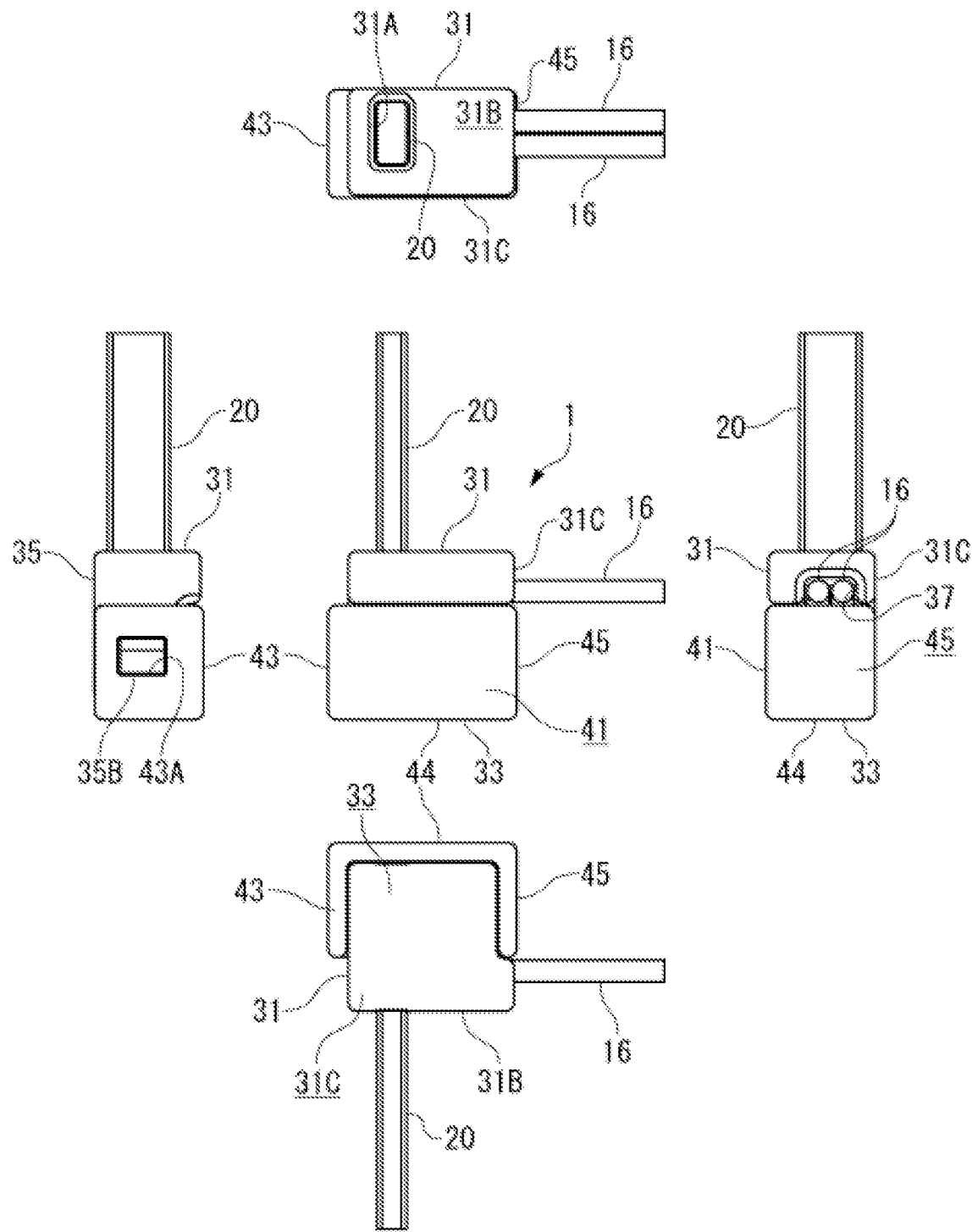
FIG. 4 is a six-sided view of the temperature sensor in FIG. 1 excluding a rear view.

As illustrated in FIG. 3B and FIG. 4, the reference wall 31 includes a holding hole 31A penetrating through the reference wall 31 from front and rear surfaces in the front-rear direction Z. When the covering body 20 is inserted into the holding hole 31A, the sensor element 10 is held by the reference wall 31. In FIG. 3B, a gap is illustrated between the covering body 20 and the holding hole 31A; however, the covering body 20 can be pressed into the holding hole 31A by adjusting dimensions of the covering body 20 and the holding hole 31A.

A front end surface of the reference wall 31 configures an abutting portion 31B. The abutting portion 31B bears the second function to regulate the insertion depth of the covering body 20 of the sensor element 10 into the coil 101, in the temperature sensor 1 assembled to the stator 100. In other words, as illustrated in FIG. 7, when the abutting portion 31B abuts on an end surface CE of the coil 101, the sensor element 10 is inserted into the coil 101 by a dimension protruding from the abutting portion 31B. Therefore, a protruding dimension D is previously determined, which makes it possible to regulate the insertion depth of the sensor element 10. In the present embodiment, a flat surface is illustrated as an example of the abutting portion 31B; however, an optional form such as a curved surface and an irregular surface is adoptable. This is true of a supporting portion 31C described below.

A lower end surface of the reference wall 31 configures the supporting portion 31C. The supporting portion 31C extends in a direction intersecting with the abutting portion 31B, more specifically, in an orthogonal manner with respect to the abutting portion 31B. As illustrated in FIG. 6 and FIG. 7, in the temperature sensor 1 assembled to the stator 100, the supporting portion 31C is placed on an upper end surface of the core 103, and the first housing 30 is supported by the core 103. In other words, the first housing 30 bears the first function to generate the mutual pressing force between the coil 101 and the covering body 20 inserted into the gap 105 of the coil 101, thereby making it difficult for the covering body 20 to slip out of the gap 105 of the coil 101. As illustrated in FIG. 7, the covering body 20 protrudes from the abutting portion 31B at a position separated by a distance L3 from the supporting portion 31C. The covering body 20 is separated from the supporting portion 31C as described above, which secures deflection of the covering body 20.

The side walls 33A and 33B form a housing chamber 32 in which the lead wires 16 including the folded parts 18 and the bent parts 19 are housed, with the reference wall 31, the partition wall 34, and the connection wall 35.

As illustrated in FIG. 2A, the partition wall 34 is parallel to the connection wall 35 and is formed so as to connect the side wall 33A and the side wall 33B. As illustrated in FIG. 3B, the front side F of the partition wall 34 communicates with the reference wall 31, but the rear side B of the partition wall 34 is located closer to the front side F than the rear edges of the side walls 33A and 33B.

The partition wall 34 is disposed in a gap of the folded parts 18 of the lead wires 16 housed in the housing chamber 32. Therefore, the lead wires 16 stride over the partition wall 34 on the front and rear sides of the folded parts 18.

The reference wall 31 has rigidity greater than rigidity of the covering body 20. For example, when the covering body 20 protruding from the holding hole 31A is considered as a cantilever, and a load is applied to a front end of the covering body 20, the covering body 20 is deflected but does not deform. As described above, when the reference wall 31 has rigidity greater than rigidity of the covering body 20, the covering body 20 inserted into the gap 105 is deflected.

The connection wall 35 forms the housing chamber 32 with the reference wall 31, the side walls 33A and 33B, and the partition wall 34. The connection wall 35 includes, on an outer peripheral surface 35A, a locking protrusion 35B locking the second housing 40 and the first housing 30.

[Second Housing 40]

Next, the second housing 40 is described.

The second housing 40 holds the sensor element 10 with the first housing 30. Further, the second housing 40 covers the housing chamber 32 to protect the lead wires 16. The second housing 40 is mutually assembled to the first housing 30 to form the housing chamber 32 along a bent shape of the lead wires 16 including the folded parts 18 and the bent parts 19.

As illustrated in FIG. 2 to FIG. 4, the second housing 40 has a shape in which portions corresponding to two surfaces of six surfaces are opened. In other words, the second housing 40 includes a front wall 41, and a first side wall 43, a second side wall 44, and a third side wall 45 that hang down from three sides of the front wall 41. As illustrated in FIG. 3B and FIG. 4, the first side wall 43 includes a locking hole 43A. The second housing 40 is integrally formed by, for example, injection molding of a resin material.

The front wall 41 corresponds to the side wall 33A of the first housing 30. When the second housing 40 is assembled to the first housing 30, the front wall 41 covers the side wall 33B.

The first side wall 43 corresponds to the connection wall 35 of the first housing 30. When the second housing 40 is assembled to the first housing 30, the first side wall 43 covers the connection wall 35. At this time, the locking protrusion 35B of the connection wall 35 is inserted into the locking hole 43A of the first side wall 43, which prevents the second housing 40 from detaching from the first housing 30.

The second side wall 44 and the third side wall 45 correspond to the opening 36 of the first housing 30. When the second housing 40 is assembled to the first housing 30, the second side wall 44 and the third side wall 45 cover the opening 36. As a result, the lead wires 16 housed in the housing chamber 32 are shielded from outside. Further, the third side wall 45 inhibits the folded parts 18 of the lead wires 16 from being spread.

When the second housing 40 is assembled to the first housing 30, the housing chamber 32 along the folded parts 18 and the bent parts 19 of the lead wires 16 is formed between the first housing 30 and the second housing 40 as illustrated in FIG. 3B.

[Procedure to Assemble Temperature Sensor 1]

Next, a procedure to assemble the temperature sensor 1 is described with reference to FIGS. 5A to 5C.

Figure 5A:
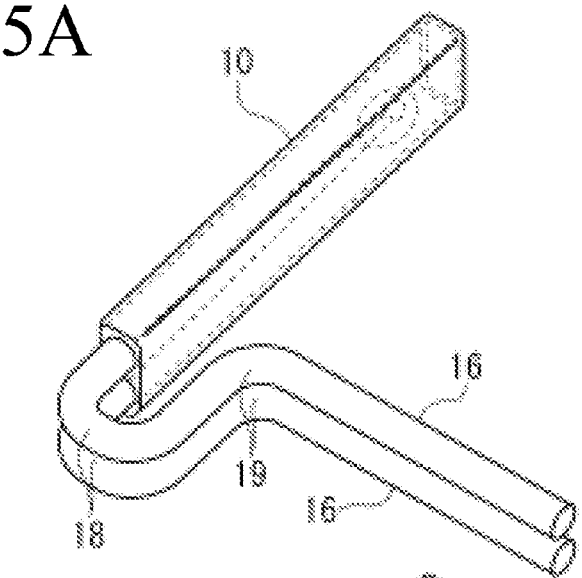
FIGS. 5A to 5C are perspective views illustrating a procedure to assemble the temperature sensor in FIG. 1.

As illustrated in FIG. 5A, the sensor element 10 in which the folded parts 18 and the bent parts 19 are previously formed is prepared. The lead wires 16 initially have straight forms, and the folded parts 18 and the bent parts 19 can be easily formed by folding and bending the lead wires 16 to make creases at predetermined positions.

Figure 5B:
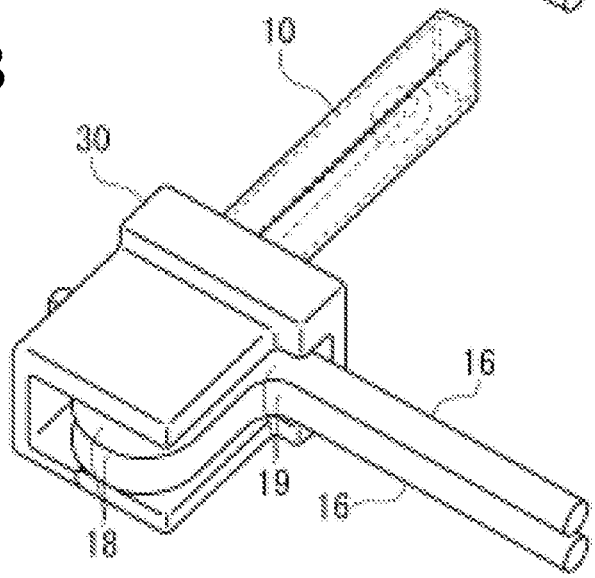

As illustrated in FIG. 5B, the sensor element 10 including the folded parts 18 and the bent parts 19 is assembled to the first housing 30. The sensor element 10 is assembled by being inserted into the holding hole 31A of the first housing 30 after the covering body 20 is positioned to the holding hole 31A. When the covering body 20 is inserted until the inside of the folded parts 18 abuts on the rear end of the partition wall 34, assembly of the sensor element 10 to the first housing 30 is completed. As a result, the covering body 20 of the sensor element 10 protrudes from the abutting portion 31B of the reference wall 31 by a predetermined dimension. Further, the front and rear sides of the folded parts 18 of the lead wires 16 are housed in the housing chamber 32 while striding over the partition wall 34, and portions ahead of the bent parts 19 are drawn out to the outside of the first housing 30. The lead wires 16 drawn out to the outside extend in a direction intersecting with the covering body 20, more specifically, in an orthogonal manner with respect to the covering body 20.

Figure 5C:
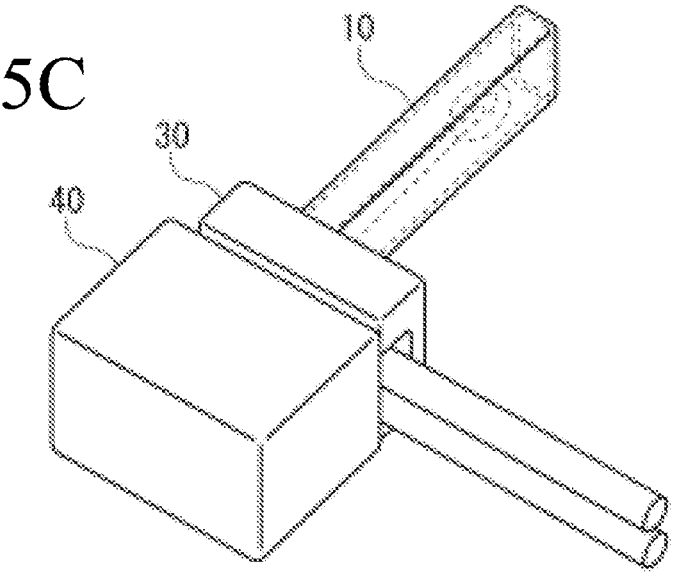

Next, as illustrated in FIG. 5C, the second housing 40 is positioned to the first housing 30, and is pushed into the first housing 30 until a front end of the second housing 40 abuts on the reference wall 31. In this process, the locking protrusion 35B of the first housing 30 is inserted into the locking hole 43A of the second housing 40, the first housing 30 and the second housing 40 are prevented from slipping out of each other, and assembly of the temperature sensor 1 is completed.

[Attachment of Temperature Sensor 1 to Stator 100]

Next, attachment of the temperature sensor 1 to the stator 100 is described with reference to FIG. 6 and FIG. 7.

The temperature sensor 1 is attached to the stator 100 that includes the core 103 and the coil 101 wound around the core 103, and detects the temperature of the coil 101. To detect the temperature of the coil 101, the temperature sensor 1 uses the gap 105 formed between the coil 101 and the core 103. The gap 105 may be intentionally formed for temperature detection, or may be inevitably formed when the coil 101 is wound. The gap 105 is provided in a predetermined range in the height direction Y from an upper end surface 107 of the core 103, and has an opening formed in, for example, a mountain shape. The sensor element 10 is inserted into the gap 105, and the temperature sensor 1 detects the temperature of the coil 101.

To make it difficult for the covering body 20 of the temperature sensor 1 to slip out of the gap 105, it is desired to bring the covering body 20 into tight contact with the coil 101. In particular, in a case of an electric motor used in an environment receiving vibration, for example, in an automobile, the tight contact is important. The temperature sensor 1 achieves the tight contact to the coil 101 by using the gap 105 formed between the coil 101 and the core 103. In other words, in the present embodiment, the temperature sensor 1 is placed on the upper end surface 107 of the core 103 as illustrated in FIG. 6, to secure tight contact of the covering body 20 to the coil 101. This is described below with reference to FIG. 7.

As illustrated in FIG. 7, the temperature sensor 1 is placed on the upper end surface 107 of the core 103 while the supporting portion 31C of the first housing 30 is supported by the upper end surface 107. The covering body 20 of the temperature sensor 1 is inserted into the gap 105 formed between the coil 101 and the core 103. Elements to bring the covering body 20 inserted into the gap 105 into tight contact with the coil 101 are examined with reference to the gap 105 illustrated in FIG. 6.

In the gap 105 in FIG. 6, the covering body 20 comes into tight contact with the coil 101 in the two directions of the width direction X and the height direction Y. First, in the width direction X, when the inserted covering body 20 is compressed in the width direction, the covering body 20 comes into tight contact with the coil 101. In the height direction Y, when the inserted covering body 20 is compressed in the height direction Y or the covering body 20 is deflected in the height direction, the covering body 20 comes into tight contact with the coil 101.

The covering body 20 is made of a resin material having relatively large elasticity. When it is assumed that the covering body 20 is inserted into the gap 105 by manual operation of a worker, a compression amount in the width direction X is small. To obtain a large compression amount in the width direction X, large insertion force is necessary. In contrast, as illustrated in FIG. 7, the protruding amount D of the covering body 20 from the first housing 30 is large. Therefore, when downward force F1 acts on the covering body 20, the covering body 20 is easily deflected downward relative to the abutting portion 31B in addition to downward deflection of the covering body 20 itself. Therefore, the covering body 20 can be easily inserted into the gap 105 by using the deflection of the covering body 20 in the height direction Y. Further, in response to the deflection, downward force F1 is generated in the coil 101 and upward force F2 acts on the covering body 20 against the downward force F1. As a result, the covering body 20 can come into tight contact with the coil 101 in the height direction Y.

To bring the covering body 20 into tight contact with the coil 101 by using the deflection of the covering body 20 as described above, it is necessary to adjust, relative to a dimension L5 of the gap 105, a dimension L3 from the supporting portion 31C to a lower end of the covering body 20 and a dimension L4 of the covering body 20 as in the following expression (1). However, when the dimension L3+L4 is excessively larger than the dimension L5, the covering body 20 cannot be inserted into the gap 105. Therefore, it is necessary to set the dimension L3 and the dimension L4 in consideration of the deflection amount of the covering body 20.

$$L5 \leq L3+L4 \tag{1}$$

[Effects by Temperature Sensor 1]

Effects by the temperature sensor 1 described above are described.

[Tight Contact of Covering Body 20 and Coil 101]

The covering body 20 of the temperature sensor 1 is inserted into the gap 105 while the supporting portion 31C of the reference wall 31 is supported by the upper end surface 107 of the coil 101. This generates deflection in the height direction Y in the covering body 20, which makes it possible to bring the covering body 20 into tight contact with the coil 101. Therefore, according to the temperature sensor 1, it is possible to make it difficult for the covering body 20 to slip out of the gap 105. In addition, since the covering body 20 comes into tight contact with the coil 101, the temperature sensor 1 can detect the temperature with high accuracy.

[Regulation of Insertion Depth]

In the temperature sensor 1, as illustrated in FIG. 7, the abutting portion 31B abuts on the coil 101, and the covering body 20 is accordingly inserted into the coil 101 by the dimension protruding from the abutting portion 31B. Therefore, the protruding dimension D is previously determined, which makes it possible to regulate the insertion depth of the sensor element 10.

For example, if the portion regulating the insertion depth is not present and the covering body 20 is erroneously deeply inserted into the gap 105, the front end of the covering body 20 is exposed to the outside from the coil 101. For example, if a rotor of an electric motor is provided in the outside of the coil 101, the covering body 20 may collide with the rotor. Alternatively, the covering body 20 receiving vibration may gradually move, and the front end of the covering body 20 may be exposed to the outside.

[Folded Part 18 and Bent Part 19 of Lead Wire 16]

In the temperature sensor 1, the lead wires 16 include the folded parts 18 and the bent parts 19, and the lead wires 16 drawn out from the first housing 30 and the second housing 40 are orthogonal to the covering body 20. It is assumed that, in FIG. 3B, tensile force T is applied to the lead wires 16 drawn out from the first housing 30 and the second housing 40. At this time, the force acts on the lead wires 16 in a direction in which the folded parts 18 are spread as illustrated by arrows S; however, the force hardly acts in a direction in which the covering body 20 slips out of the first housing 30 because of presence of the bent parts 19 and the folded parts 18.

As described above, according to the temperature sensor 1, the folded parts 18 and the bent parts 19 are provided in the lead wires 16, which prevents the covering body 20 from slipping out of the first housing 30 and the second housing 40.

Further, in the temperature sensor, since the lead wires 16 include the folded parts 18 and the bent parts 19, a distance L1 from the end surface CE of the coil 101 to the lead wires 16 is short as illustrated in FIG. 7. For example, if the folded parts 18 are not provided, a distance L2 from the end surface CE of the coil 101 to the lead wires 16 is long as illustrated in FIG. 7.

When the distance L1 is short, the lead wires 16 are positioned close to the coil 101, and the lead wires 16 are easily crept and bundled to the coil 101. Further, the lead wires 16 hardly disturbs arrangement of other members around the stator 100. In other words, adopting the above-described routing path of the lead wires 16 makes it possible to realize the temperature sensor 1 with high space efficiency.

[First Modification: Temperature Sensor 2]

Figure 8:
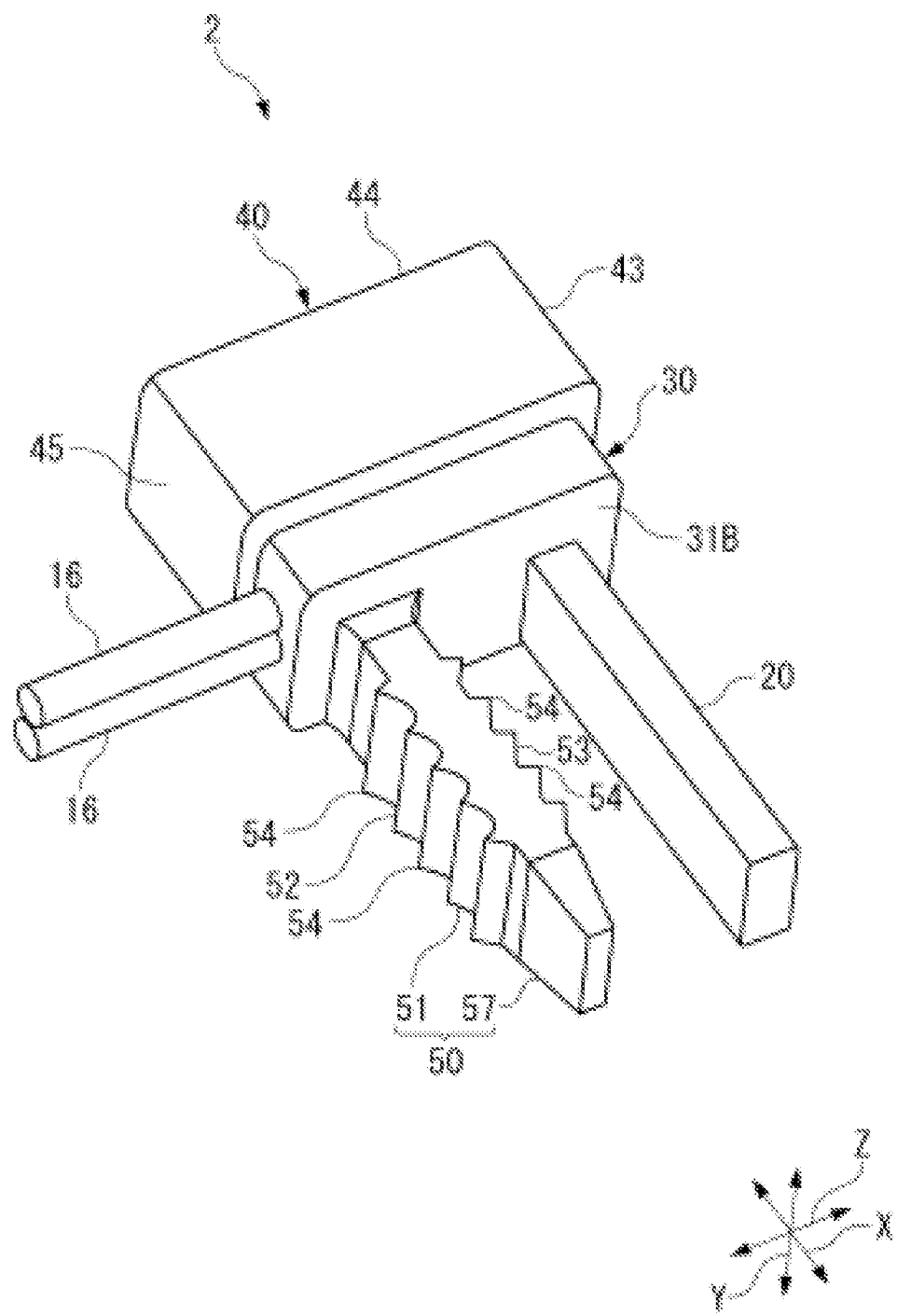
FIG. 8 is a perspective view illustrating a temperature sensor according to a first modification.

In the temperature sensor 1, only the covering body 20 is inserted into the gap 105 of the coil 101. The temperature sensor according to the present invention can include a fixing member 50 that is an element to be inserted into the gap 105, in addition to the covering body 20. A temperature sensor 2 according to a first modification is described below with reference to FIG. 8 and FIG. 9. Note that, in the temperature sensor 2, the components same as the components of the temperature sensor 1 are denoted by the reference numerals same as the temperature sensor 1, and descriptions of such components are omitted.

The temperature sensor 2 includes the fixing member 50 formed integrally with the first housing 30. The fixing member 50 is extended from the abutting portion 31B of the first housing 30 so as to be parallel to the covering body 20. A dimension of the fixing member 50 from the abutting portion 31B to a front end thereof in the front-rear direction X is substantially equal to the dimension of the covering body 20. In addition, dimensions of the fixing member 50 in the width direction Z and the height direction Y are also substantially equal to the dimensions of the covering body 20. The dimensional relationship is illustrative, and the dimensions of the covering body 20 and the fixing member 50 may be difference from each other.

The fixing member 50 includes a base portion 51 communicating with the first housing 30, and a front end portion 57 communicating with the base portion 51.

The base portion 51 includes a front surface 52 and a rear surface 53 opposite to each other, and periodic unevenness is repeatedly provided in the length direction on each of the front surface 52 and the rear surface 53 because serrations 54 are provided. The base portion 51 has a constant width W and a constant thickness T even though the unevenness by the serrations 54 are provided.

The thickness T of the front end portion 57 is reduced toward the front end. This is to facilitate insertion of the fixing member 50 into a gap 106 (FIG. 6) of the coil 101. As described above, the covering body 20 is inserted into the gap 105 (FIG. 6) adjacent to the gap 106. Therefore, an interval between the covering body 20 and the fixing member 50 is determined in consideration of an interval between the gap 105 and the gap 106 adjacent to each other.

The fixing member 50 is pressed into the gap 106. At this time, an adhesive, for example, a varnish is applied around the base portion 51 of the fixing member 50, and the base portion 51 and the front end portion 57 are joined with the coil 101 inside the gap 106. The adhesive enters recessed portions of the serrations 54 and a joining area of the adhesive is accordingly increased, which makes it possible to improve joining strength between the fixing member 50 and the coil 101.

As described above, the temperature sensor 2 including the fixing member 50 in addition to the covering body 20 is made difficult to be separated from the coil 101. In addition, since the temperature sensor 2 is joined with the coil 101 through the two members of the covering body 20 and the fixing member 50, joining can be firmly performed as compared with a case where joining is performed only through the covering body 20.

[Second Modification: Temperature Sensor 3]

Figure 10:
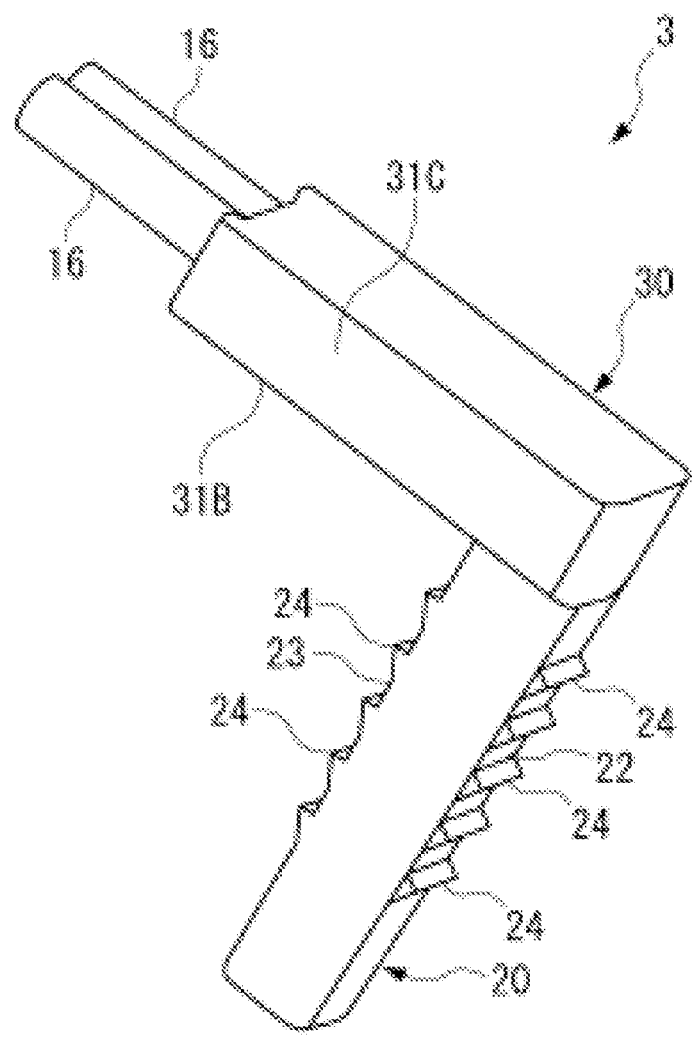
FIG. 10 is a perspective view illustrating a temperature sensor according to a second modification.

The temperature sensor 2 includes the fixing member 50 in addition to the covering body 20; however, the covering body 20 may have the function of the fixing member 50. A temperature sensor 3 according to a second modification is described below with reference to FIG. 10 and FIG. 11. Note that, in the temperature sensor 3, the components same as the components of the temperature sensor 1 are denoted by the reference numerals same as the temperature sensor 1, and descriptions of such components are omitted.

In the temperature sensor 3, serrations 24 are provided on both of a front surface 22 and a rear surface 23 of the covering body 20. Therefore, periodic unevenness is repeatedly provided in the length direction on each of the surfaces of the covering body 20.

The covering body 20 of the temperature sensor 3 is pressed into the gap 105 (or gap 106). At this time, an adhesive is applied around the covering body 20, and the covering body 20 is joined with the coil 101 inside the gap 105. The adhesive enters recessed portions of the serrations 24 and a joining area of the adhesive is accordingly increased, which makes it possible to improve joining strength between the covering body 20 and the coil 101.

As described above, the temperature sensor 3 in which the covering body 20 includes the serrations 24 is hardly detached from the coil 101. In addition, since it is unnecessary to provide the fixing member 50 in the temperature sensor 3, the configuration is simple.

Although the preferred temperature sensors 1, 2, and 3 according to the present invention are described above, the configurations described in the above-described embodiment can be selected or can be appropriately changed to other configurations without departing from the gist of the present invention.

The covering body 20 is inserted into the gap 105 while the temperature sensor 1 is supported by the core 103 of the stator 100; however, the temperature sensor according to the present invention is not limited to the form supported by the core 103. For example, when a member that can support the temperature sensor 1 near the stator 100 is present and the covering body 20 is inserted into the gap 105 of the coil 101 while the temperature sensor 1 is supported by the member, it is possible to achieve effects similar to the effects described in the present embodiment.

Further, in the temperature sensor 1, the example in which each of the abutting portion 31B and the supporting portion 31C is a flat surface having an adequate area is described as the preferred form; however, the present invention is not limited thereto. For example, it is sufficient for the abutting portion 31B to prevent the covering body 20 from being deeply inserted more than necessary, by abutting on the coil 101. Therefore, the abutting portion 31B is not necessarily the flat surface. This is true of the supporting portion 31C.

Further, in the temperature sensor 1, the rectangular parallelepiped covering body 20 including the inner layer 21 and the outer layer 23 is illustrated as the preferred form; however, the present invention is not limited thereto. In other words, it is sufficient for the covering body 20 to cover and protect the device 11 and the extension wires 15 and to have predetermined rigidity, and the covering body 20 may have a columnar shape or may include only one layer.

In the temperature sensor 1, the example including the two housing elements of the first housing 30 and the second housing 40 is described as the preferred embodiment; however, the present invention is not limited thereto. As with the temperature sensor 3 according to the second modification, even when the second housing 40 is not provided and only the first housing 30 is provided, it is possible to achieve tight contact of the covering body 20 to the coil 101 and to prevent excess insertion of the covering body 20.

In the temperature sensor 1, the example in which the covering body 20 is inserted into the gap 105 is described; however, the present invention is not limited thereto. For example, a member that protrudes from the abutting portion 31B and is to be inserted into the gap 105 can be integrally formed with the first housing 30 besides the covering body 20.

In the structure in which the temperature sensor 1 is attached to the stator 100, a stator element 109 can be provided so as to face the coil 101 as illustrated in FIG. 7. In a case where the stator element 109 is provided, if the covering body 20 of the temperature sensor 1 tries to slip out of the gap 105, the second housing 40 abuts on the stator element 109. Therefore, the covering body 20 can stay in the gap 105. As the stator element 109, a kind of a housing for the stator 100 is considered.

REFERENCE SIGNS LIST

1 Temperature sensor
10 Sensor element
11 Device
12 Thermosensitive body
13 Sealing glass
15 Extension wire
16 Lead wire
20 Covering body
22 Front surface
23 Rear surface
24 Serration
30 First housing
31 Reference wall
31A Holding hole
31B Abutting portion
31C Supporting portion
32 Housing chamber
33A, 33B Side wall
34 Partition wall
35 Connection wall
35A Outer peripheral surface
35B Locking protrusion
36 Opening
40 Second housing
41 Front wall
43 First side wall 43A Locking hole
44 Second side wall
45 Third side wall
50 Fixing member
51 Base portion
52 Front surface
53 Rear surface
54 Serration
57 Front end portion
100 Stator
101 Coil
103 Core
105, 106 Gap
107 Upper end surface
109 Stator element

The invention claimed is:

1. A temperature sensor used with being attached to an electric motor, to detect a temperature of a coil wound around a core of the electric motor, the temperature sensor comprising:
    a sensor element including a thermosensitive body, paired electric wires electrically connected to the thermosensitive body, and an electrically insulating covering body covering the thermosensitive body and the paired electric wires; and
    a housing including an abutting housing portion abutting on the coil, and a supporting housing portion extending in a direction intersecting with the abutting housing portion and supported by the core, the housing holding the sensor element, wherein
    the electrically insulating covering body protrudes from the abutting housing portion at a position separated by a predetermined distance from the supporting housing portion.

2. The temperature sensor according to claim 1, wherein
    the electrically insulating covering body is formed in a prism shape, and
    the paired electric wires are drawn out from an end of the electrically insulating covering body in a longitudinal direction to outside the electrically insulating covering body and inside the housing.

3. The temperature sensor according to claim 2, wherein the paired electric wires are changed in direction to a direction intersecting with the electrically insulating covering body inside the housing, and are drawn out from the housing.

4. The temperature sensor according to claim 3, wherein
    the paired electric wires each include a folded part directed to the thermosensitive body and a bent part bent in a direction intersecting with the electrically insulating covering body, inside the housing, and
    a portion ahead of the bent part is drawn out from the housing.

5. The temperature sensor according to claim 4, wherein the housing includes a housing chamber for the electric wires, formed along the folded parts and the bent parts.

6. The temperature sensor according to claim 5, wherein
    the housing includes a first housing including the abutting housing portion and the supporting housing portion, and a second housing assembled to the first housing and covering an opening of the first housing, and
    the first housing and the second housing are assembled to each other to form the housing chamber for the electric wires, along the folded parts and the bent parts.

7. The temperature sensor according to claim 6, wherein the temperature sensor is attached to a stator of the electric motor.

8. The temperature sensor according to claim 5, wherein the temperature sensor is attached to a stator of the electric motor.

9. An electric motor, comprising:
    a stator including a core and a coil wound around the core;
    a rotor provided to be rotatable to the stator; and
    the temperature sensor according to claim 5, the temperature sensor being attached to the coil and being configured to measure a temperature of the coil, wherein
    the electrically insulating covering body is inserted into a gap formed between the core and the coil,
    the abutting housing portion abuts on an end surface of the coil, and
    the supporting housing portion is supported by the core.

10. The temperature sensor according to claim 4, wherein the temperature sensor is attached to a stator of the electric motor.

11. An electric motor, comprising:
    a stator including a core and a coil wound around the core;
    a rotor provided to be rotatable to the stator; and
    the temperature sensor according to claim 4, the temperature sensor being attached to the coil and being configured to measure a temperature of the coil, wherein
    the electrically insulating covering body is inserted into a gap formed between the core and the coil,
    the abutting housing portion abuts on an end surface of the coil, and
    the supporting housing portion is supported by the core.

12. The temperature sensor according to claim 3, wherein the temperature sensor is attached to a stator of the electric motor.

13. The temperature sensor according to claim 3, wherein serrations are provided on a surface of the electrically insulating covering body or a surface of a fixing member provided along with the electrically insulating covering body.

14. An electric motor, comprising:
    a stator including a core and a coil wound around the core;
    a rotor provided to be rotatable to the stator; and
    the temperature sensor according to claim 3, the temperature sensor being attached to the coil and being configured to measure a temperature of the coil, wherein
    the electrically insulating covering body is inserted into a gap formed between the core and the coil,
    the abutting housing portion abuts on an end surface of the coil, and
    the supporting housing portion is supported by the core.

15. The temperature sensor according to claim 2, wherein the temperature sensor is attached to a stator of the electric motor.

16. The temperature sensor according to claim 2, wherein serrations are provided on a surface of the electrically insulating covering body or a surface of a fixing member provided along with the electrically insulating covering body.

17. An electric motor, comprising:
    a stator including a core and a coil wound around the core;
    a rotor provided to be rotatable to the stator; and
    the temperature sensor according to claim 2, the temperature sensor being attached to the coil and being configured to measure a temperature of the coil, wherein
    the electrically insulating covering body is inserted into a gap formed between the core and the coil,
    the abutting housing portion abuts on an end surface of the coil, and
    the supporting housing portion is supported by the core.

18. The temperature sensor according to claim 1, wherein the temperature sensor is attached to a stator of the electric motor.

19. The temperature sensor according to claim 1, wherein serrations are provided on a surface of the electrically insulating covering body or a surface of a fixing member provided along with the electrically insulating covering body.

20. An electric motor, comprising:
a stator including a core and a coil wound around the core;
a rotor provided to be rotatable to the stator; and
the temperature sensor according to claim 1, the temperature sensor being attached to the coil and being configured to measure a temperature of the coil, wherein
the electrically insulating covering body is inserted into a gap formed between the core and the coil,
the abutting housing portion abuts on an end surface of the coil, and
the supporting housing portion is supported by the core.

* * * * *